(12) United States Patent
Bowden

(10) Patent No.: US 11,071,976 B2
(45) Date of Patent: *Jul. 27, 2021

(54) COMPRESSED SALT BLOCK FOR A LIQUID TREATMENT APPARATUS

(71) Applicant: Harvey Water Softeners Limited, Old Woking (GB)

(72) Inventor: Ann Patricia Bowden, Horsell (GB)

(73) Assignee: Harvey Water Softeners Limited, Old Woking (GB)

( * ) Notice: Subject to any disclaimer, the term of this patent is extended or adjusted under 35 U.S.C. 154(b) by 102 days.

This patent is subject to a terminal disclaimer.

(21) Appl. No.: 16/455,986

(22) Filed: Jun. 28, 2019

(65) Prior Publication Data

US 2019/0314807 A1 Oct. 17, 2019

Related U.S. Application Data

(63) Continuation-in-part of application No. 15/410,331, filed on Jan. 19, 2017, now Pat. No. 10,376,875.

(30) Foreign Application Priority Data

Feb. 11, 2016 (GB) ...................................... 1602429
Dec. 8, 2016 (GB) ...................................... 1620844

(51) Int. Cl.
*C02F 1/42* (2006.01)
*B01J 49/50* (2017.01)
(Continued)

(52) U.S. Cl.
CPC .............. *B01J 49/75* (2017.01); *C02F 5/083* (2013.01); *C02F 1/42* (2013.01); *C02F 2303/16* (2013.01)

(58) Field of Classification Search
None
See application file for complete search history.

(56) References Cited

U.S. PATENT DOCUMENTS 342,885 A 6/1886 Thompson et al.
711,170 A 10/1902 Michelson
(Continued)

FOREIGN PATENT DOCUMENTS

CA 895224 A 3/1972
EP 1008554 A1 6/2000
(Continued)

OTHER PUBLICATIONS

Isle of Wight Water Softeners, Apr. 28, 2015, "Kinetico 2020c Water Softener", www.isleofwightwatersofteners.co.uk [online], available from http://web.archive.org/web/20150428152417/http://www.isleofwightwatersofteners.co.uk/products.html.
(Continued)

*Primary Examiner* — Matthew O Savage
(74) *Attorney, Agent, or Firm* — GableGotwals

(57) ABSTRACT

The invention relates to a compressed salt block comprising a longitudinally extending elongated body having a vertical longitudinal axis, a top horizontal face, a bottom horizontal face. The block portion has a rectangular cross-section taken in a horizontal plane that is perpendicular to the vertical longitudinal axis, wherein the rectangular cross-section is defined by a major front exterior surface that is a base surface of the block portion, a major rear surface, and a pair of exterior minor surfaces. An extension portion is formed integrally with the major rear surface of the rectangular cross-section of the block portion as a single compressed salt block, wherein the extension portion has a cross-sectional area in said horizontal plane in the form of a right truncated triangle, the extension portion having a first exterior side that is contiguous with one of the pair of exterior minor side surfaces of the block portion, a second side that is contiguous with the major rear surface of the block portion, and an exterior hypotenuse side that extends at an acute angle (Continued)

relative to the base surface of the block portion from a rear edge of the first exterior side toward the major rear surface of the block portion. A horizontal cross section of the elongated body is constant along the vertical longitudinal axis of the elongated body and the exterior hypotenuse side of the extension portion defines a functional face adapted to abut against a vertical wall or an exterior vertical surface of a tank of a water softener apparatus to position the compressed salt block within said water softener apparatus.

13 Claims, 10 Drawing Sheets

(51) Int. Cl.
  *B01J 49/75* (2017.01)
  *C02F 5/08* (2006.01)

(56) References Cited

U.S. PATENT DOCUMENTS

| | | |
|---|---|---|
| 1,372,590 A | 3/1921 | Beyea |
| 2,228,246 A | 1/1941 | Bergan |
| 3,227,524 A | 1/1966 | White |
| 3,891,552 A | 6/1975 | Prior et al. |
| 4,451,381 A | 5/1984 | Heiss et al. |
| 4,513,459 A | 4/1985 | Doughty |
| 10,376,875 B2 * | 8/2019 | Bowden .................. C02F 5/083 |
| 2001/0001511 A1 | 5/2001 | Hansen et al. |
| 2009/0220559 A1 | 9/2009 | Feldman et al. |
| 2011/0293481 A1 | 12/2011 | Eanes et al. |

FOREIGN PATENT DOCUMENTS

| | | |
|---|---|---|
| GB | 435280 A | 9/1935 |
| GB | 773728 A | 5/1957 |
| GB | 945696 A | 1/1964 |
| GB | 1024825 A | 4/1966 |
| WO | 2013052357 A2 | 4/2013 |

OTHER PUBLICATIONS

TwinTecSofteners, Jun. 9, 2011, "TwinTec S3 block salt water softener", www.youtube.com [online], available from https://www.youtube.com/watch?v=Uj5Jv2JGFAY.
Twintec, "Block Water Softeners" May 1, 2009, S3.

* cited by examiner

COMPRESSED SALT BLOCK FOR A LIQUID TREATMENT APPARATUS

CROSS-REFERENCE TO RELATED APPLICATIONS

This is a Continuation-In-Part application of U.S. patent application Ser. No. 15/410,331 filed 19 Jan. 2017 which claims priority to British Patent Application No. 1620844.9 filed 8 Dec. 2016 and to British Patent Application No. 1602429.1 filed Nov. 2, 2016, each of which is incorporated herein by reference.

STATEMENT REGARDING FEDERALLY SPONSORED RESEARCH

Not applicable

NAMES OF THE PARTIES TO A JOINT RESEARCH AGREEMENT

Not applicable

REFERENCE TO A SEQUENCE LISTING

Not applicable

FIELD OF THE INVENTION

The invention relates to a compressed salt block for use in a water softener apparatus or system.

BACKGROUND OF THE INVENTION

Water softening systems have been developed and widely used in domestic homes of countries in which water having high minerals content or so called "hard water" is supplied. In a typical water softening system such as an ion exchange water softener, the "hard ions" are generally removed by passing the "hard water" through a water softening cylinder in which an ion exchange medium is located. The medium exchanges the "hard ions" such as calcium or magnesium ions with "soft ions" such as sodium ions.

When all the available "soft ions" in the medium are depleted after a period of water softening, the medium can be regenerated by eluting the cylinder with a salt solution such as a brine solution. The brine is typically prepared and stored in a brine tank, in which salt in its various forms such as pellets, granules or lumps will be added to from time to time so as to maintain the salinity of the brine. Salts of these common forms are widely available and are relatively easy to handle, however, with known disadvantages including that they create void spaces known as interstices. For example, granular salts would typically have 30% by volume of void spaces within the interstices, and common tablet salts would typically have 50% of void spaces within the interstices. These void spaces take up unnecessary volume in the brine tank and therefore, sizes of the traditional brine tanks are generally larger than need be. Furthermore, use of the common forms of salt can result in spillages and can require devices such as funnels to aid replenishment of salt into the brine tank.

OBJECTS OF THE INVENTION

An object of the present invention is to provide a form of compressed salt block for use in a water softener apparatus, in which the aforesaid shortcomings are mitigated or at least to provide a useful alternative.

Another object of the invention is to mitigate or obviate to some degree one or more problems associated with known compressed salt blocks for use in water softener apparatuses or systems.

Another object is to provide a novel method of forming a compressed salt block.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION in a first main aspect, the invention provides a water softener apparatus compressed salt block, the salt block formed by molding as a compressed salt block to comprise: a longitudinally extending elongated body having a vertical longitudinal axis, a top horizontal face, a bottom horizontal face, and comprising: a block portion having a rectangular cross-section taken in a horizontal plane that is perpendicular to the vertical longitudinal axis, wherein the rectangular cross-section is defined by a major front exterior surface that is a base surface of the block portion, a major rear surface, and a pair of exterior minor surfaces; and an extension portion formed integrally with the major rear surface of the rectangular cross-section of the block portion as a single compressed salt block, wherein the extension portion has a cross-sectional area in said horizontal plane in the form of a right truncated triangle, the extension portion having a first exterior side that is contiguous with one of the pair of exterior minor side surfaces of the block portion, a second side that is contiguous with the major rear surface of the block portion, and an exterior hypotenuse side that extends at an acute angle relative to the base surface of the block portion from a rear edge of the first exterior side toward the major rear surface of the block portion; wherein a horizontal cross section of the elongated body is constant along the vertical longitudinal axis of the elongated body and the exterior hypotenuse side of the extension portion defines a functional face adapted to abut against a vertical wall or an exterior vertical surface of a tank of a water softener apparatus to position the compressed salt block within said water softener apparatus.

In a second main aspect, the invention provides a water softener apparatus, comprising: a housing adapted to accommodate at least one tank and at least one compressed salt block comprising: a longitudinally extending elongated body having a vertical longitudinal axis, a top horizontal face, a bottom horizontal face, and comprising: a block portion having a rectangular cross-section taken in a horizontal plane that is perpendicular to the vertical longitudinal axis, wherein the rectangular cross-section is defined by a major front exterior surface that is a base surface of the block portion, a major rear surface, and a pair of exterior minor surfaces; and an extension portion formed integrally with the major rear surface of the rectangular cross-section of the block portion as a single compressed salt block, wherein the extension portion has a cross-sectional area in said horizontal plane in the form of a right truncated triangle, the extension portion having a first exterior side that is contiguous with one of the pair of exterior minor side surfaces of the block portion, a second side that is contiguous with the major rear surface of the block portion, and an exterior hypotenuse side that extends at an acute angle relative to the base surface of the block portion from a rear edge of the first exterior side toward the major rear surface of the block portion; wherein a horizontal cross section of the elongated body is constant along the vertical longitudinal axis of the elongated body and the exterior hypotenuse side of the extension portion defines a functional face adapted to abut against a vertical wall or an exterior vertical surface of a tank of a water softener apparatus to position the compressed salt block within said water softener apparatus; wherein the housing of said water softener apparatus comprises a first space portion for accommodating said at least one tank, and a second space portion for accommodating the at least one compressed salt block; wherein the extension portion of the at least one compressed salt block extends into a space in the second space portion between an external surface of the at least one tank and an inner wall surface of the housing adjacent the external surface of the at least one tank to thereby position the at least one compressed salt block within the housing.

In a third main aspect, the invention provides a method of forming a comprised salt block according to the first main aspect, the method comprising the step of compressing loose salt in a suitably shaped anvil or mold in a direction perpendicular to at least one of the horizontal faces of the compressed salt block being formed, i.e. the direction of compression of the loose salt is parallel to the exterior hypotenuse side of the extension portion of the compressed salt block being formed.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DETAILED DESCRIPTION OF THE INVENTION

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the claims hereof, any element expressed as a means for performing a specified function is intended to encompass any way of performing that function. It is thus regarded that any means that can provide those functionalities are equivalent to those shown herein.

In general, a compressed block salt, which hereinafter is referred to as a salt block, is a block form of compressed salt for use in a liquid treatment apparatus such as a brine tank of a water softener system to provide the required salinity to the brine for, for example, regenerating a water softening column. In use, the compressed salt block can be easily loaded in bulk into the housing of the brine tank, with the salt slowly releasing over time into the water to generate the brine.

Figure 1:
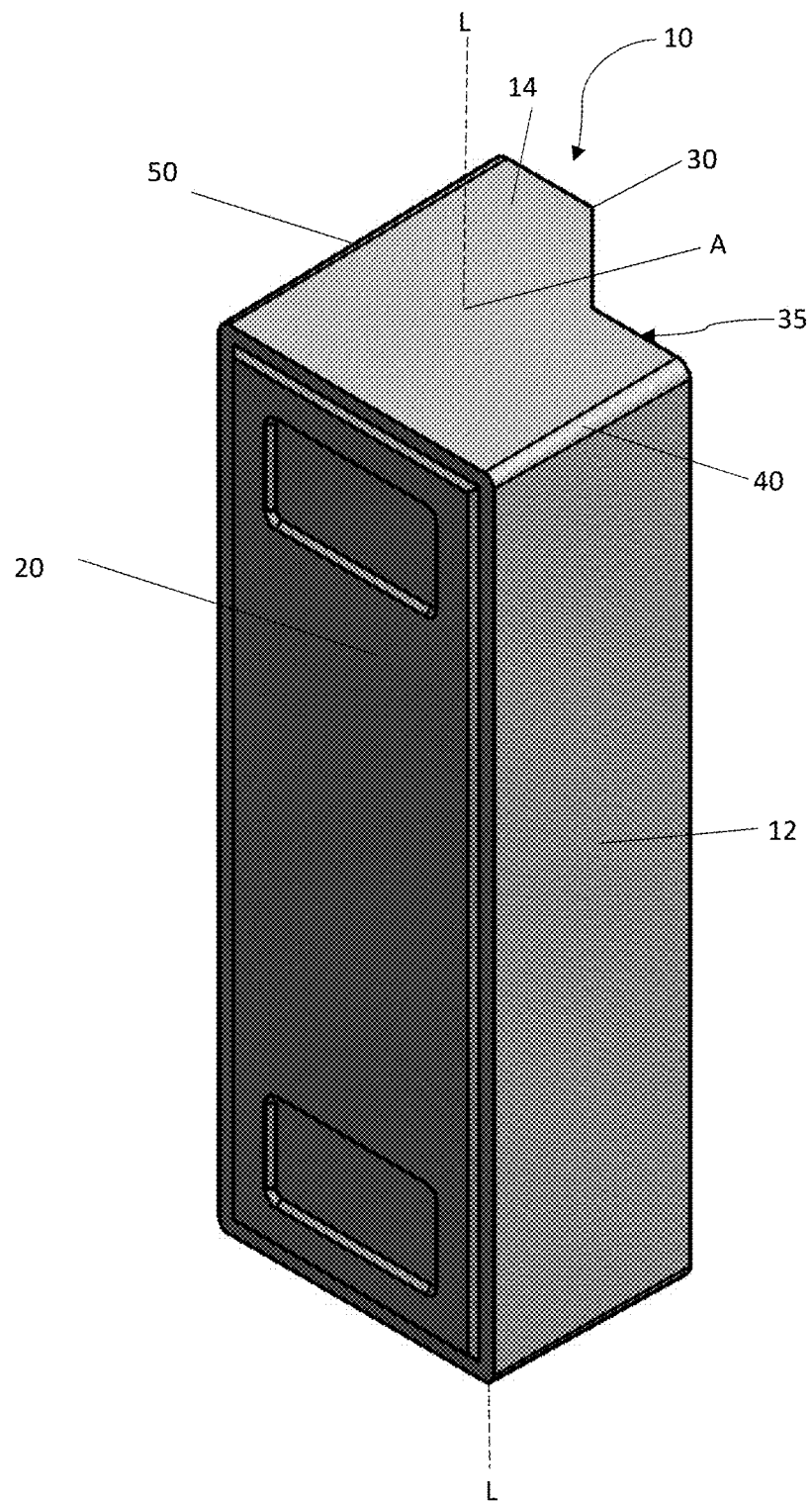
FIG. 1 is a perspective view showing a compressed salt block according to a first embodiment of the present invention.

Referring to FIG. 1, shown is an embodiment of the compressed salt block 10 of the present invention. The compressed salt block 10 is configured to comprise a first main portion comprising an irregularly shaped extension portion adapted to be positioned in use adjacent the exterior of a liquid treatment tank such as the water softening column, and a second portion comprising a regularly shaped block portion adapted to be positioned in use adjacent an inner wall of the housing of the liquid treatment apparatus. The irregularly shaped extension portion and the regularly shaped block portion are integrally formed as a single compressed salt block. A primary function of both the block portion and the extension portion is to provide salt in a compressed block form for replenishing bring in a water softener apparatus, but the extension portion has additional functions as explained hereinafter. As shown in FIG. 1, the compressed salt block 10 comprises an elongated body 12 having an irregular cross section A, i.e. an irregular horizontal cross section, with the tank-facing first main portion having an extension portion 14 which extends into a space defined by an external surface of the tank and an inner wall surface of the housing adjacent the external surface of the tank so as to preferably position and hold the compressed salt block 10 within the housing.

Figure 2:
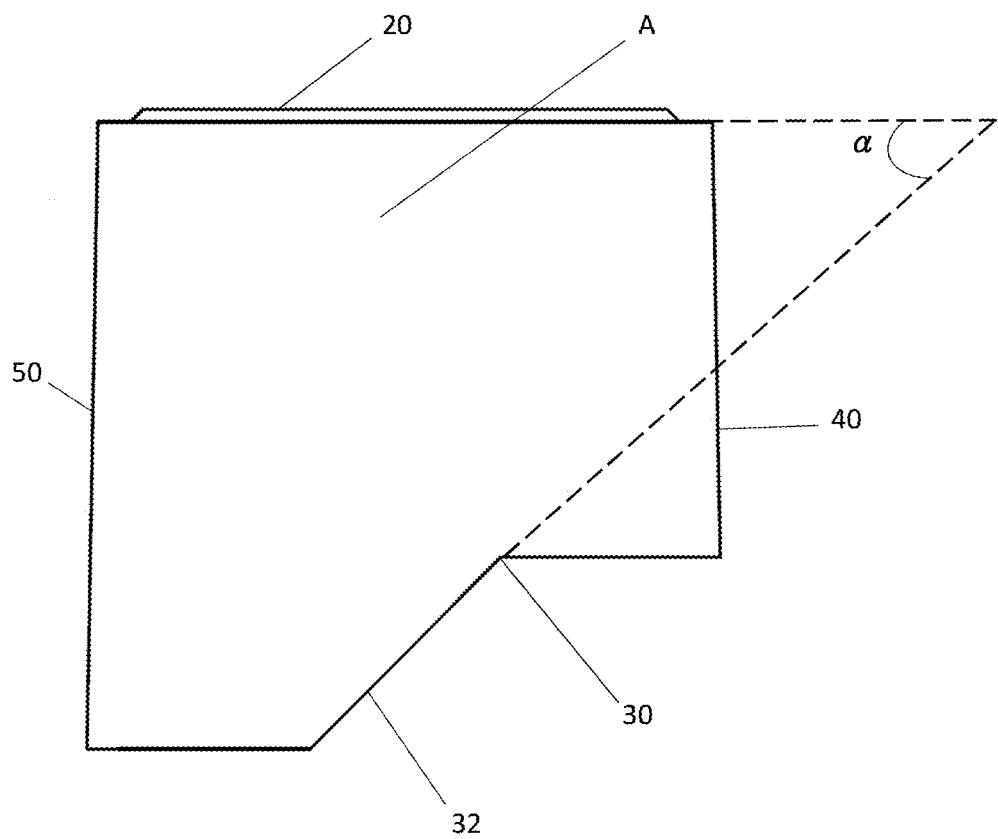
FIG. 2 is a top, cross sectional view of the compressed salt block of FIG. 1.

As shown in FIG. 2, the cross section A of the salt block 10 comprises a base side or line 20 and a functional side 30 generally opposing the base line or side 20. At least a portion of the functional side 30 such as line 32 as shown in the figure forms an acute angle α to the base line 20 thereby forming an indented portion or an extended portion of the cross section A. Preferably, the cross section A is constant along the length or the longitudinal axis L-L (FIG. 1) of the body 12.

As shown in FIG. 1, the salt block includes a longitudinally extending elongated body 12 having a vertical longitudinal axis L, a top horizontal surface, and a bottom horizontal surface. The elongated body includes a block portion having a rectangular cross-section taken in a horizontal plane that is perpendicular to the vertical longitudinal axis, wherein the rectangular cross-section is defined by a major front exterior surface that is a base surface 20 of the block portion, a major rear surface along functional face 35, and a pair of exterior minor surfaces 40, 50; and an extension portion 14 formed integrally with the major rear surface of the rectangular cross-section of the block portion as a single compressed salt block.

As shown in FIGS. 1-2, the extension portion 14 has a cross-sectional shape in said horizontal plane in the form of a right truncated triangle, the extension portion having a first exterior side that is contiguous with the exterior side surface 50 of the block portion, a second side that is contiguous with the major rear surface of the block portion, and an exterior hypotenuse side 32 that extends at an acute angle relative to the base surface 20 of the block portion from a rear edge of the first exterior side toward the major rear surface of the block portion.

As shown in FIGS. 1-2, a horizontal cross section of the elongated body is constant along the vertical longitudinal axis of the elongated body and the exterior hypotenuse side 32 of the extension portion defines a functional face 32 adapted to abut against a vertical wall or an exterior vertical surface of a tank of a water softener apparatus to position the compressed salt block within said water softener apparatus.

As seen in FIG. 1, at least the base side or face of the salt block 10 may include indentations positioned near the top and bottom faces of the salt block 10 to aid gripping of the salt block 10 by a user's fingers.

Figure 5:
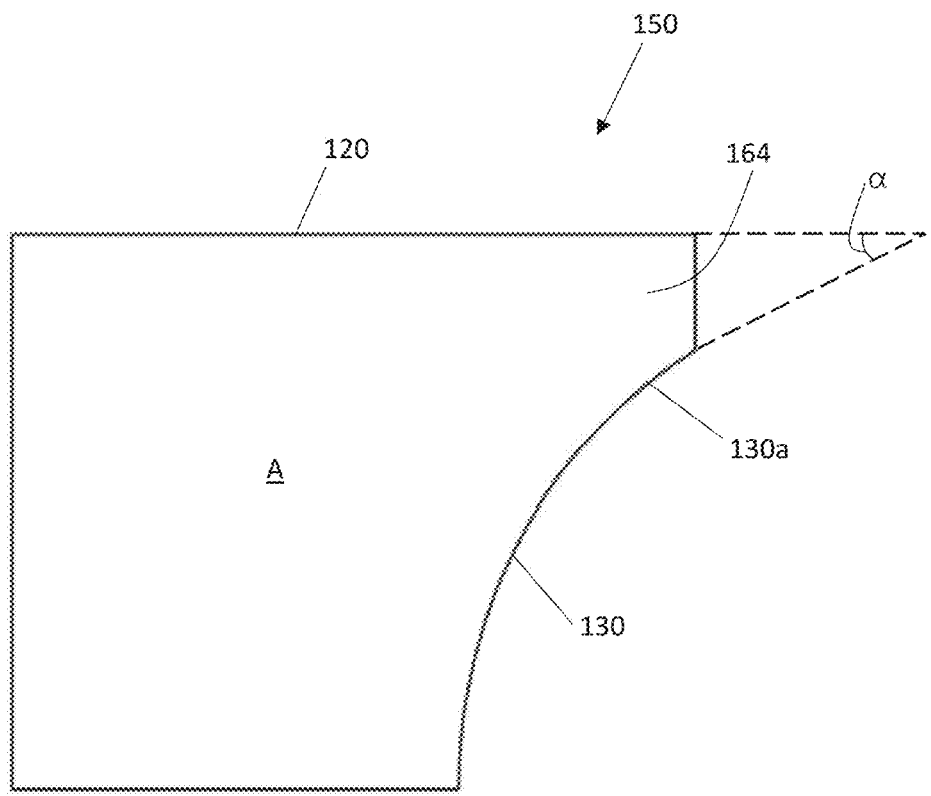
FIG. 5 is a top, cross sectional view of the compressed salt block of FIG. 4.
Figure 8:
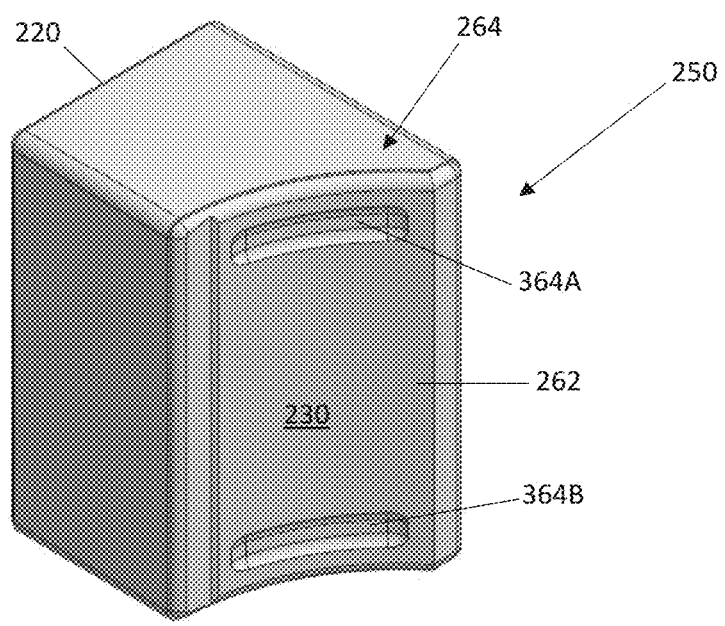
FIG. 8 is a rear perspective view of the compressed salt block of FIG. 7.
Figure 9:
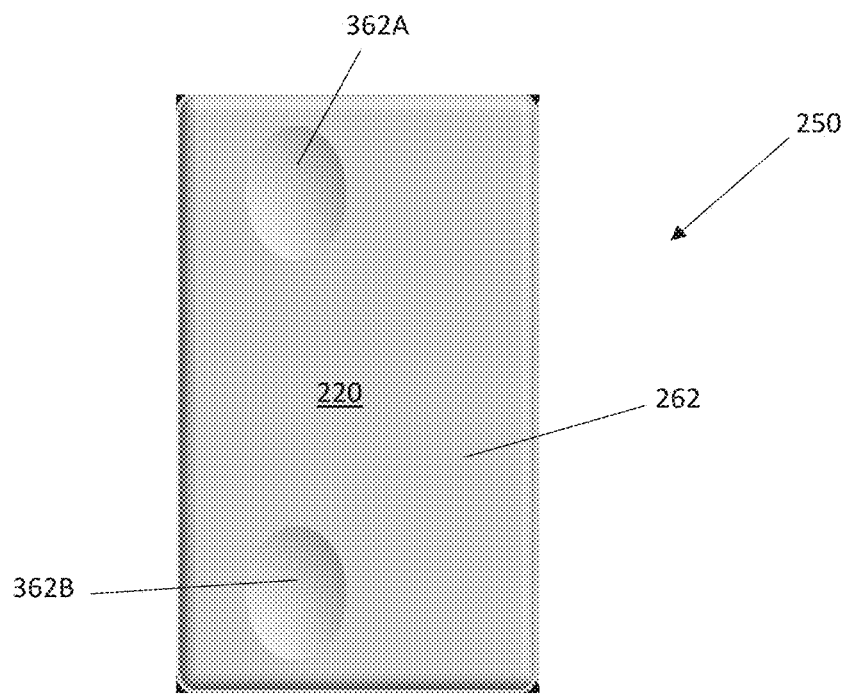
FIG. 9 is a front view of the compressed salt block of FIG. 7.
Figure 10:
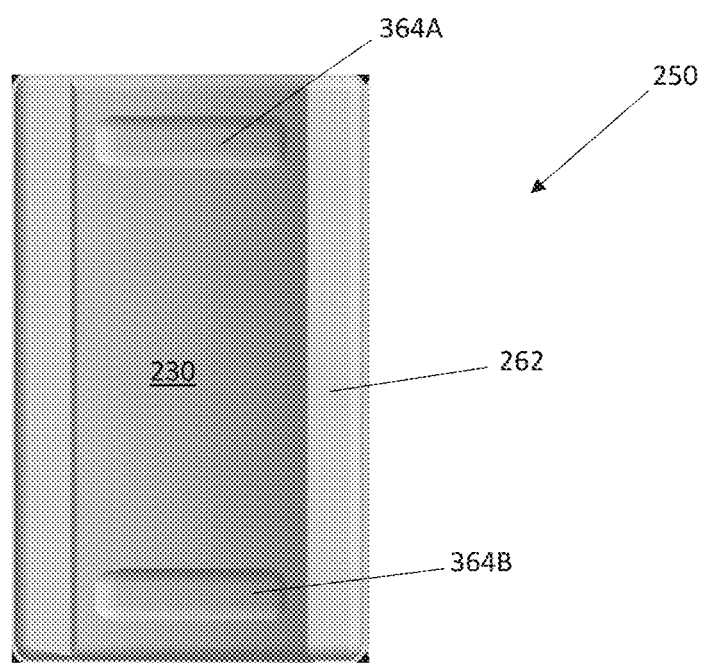
FIG. 10 is a rear view of the compressed salt block of FIG. 7.

Specifically, the cross section A comprises at least two sides 40, 50 substantially perpendicular to, but connected one at each end of the base side 20. The two sides 40, 50 connect with the functional side 30. Preferably, the functional side 30 comprises at least one inclined side relative to the base side 20 such as denoted by line 32 as shown in FIG. 2. Alternatively, the functional side 30 may comprises at least one curve line (FIGS. 5 & 8). The cross-section A may comprise an irregular polygon formed of a rectangular prism comprising the block portion and a truncated triangular prism comprising the extended portion. The block portion is that part of the salt block bounded by base side 20, perpendicular side 40, the part of perpendicular side 50 corresponding to side 40 and an imaginary side extending perpendicularly between the end of side 40 and a corresponding pint on side 50.

Figure 3:
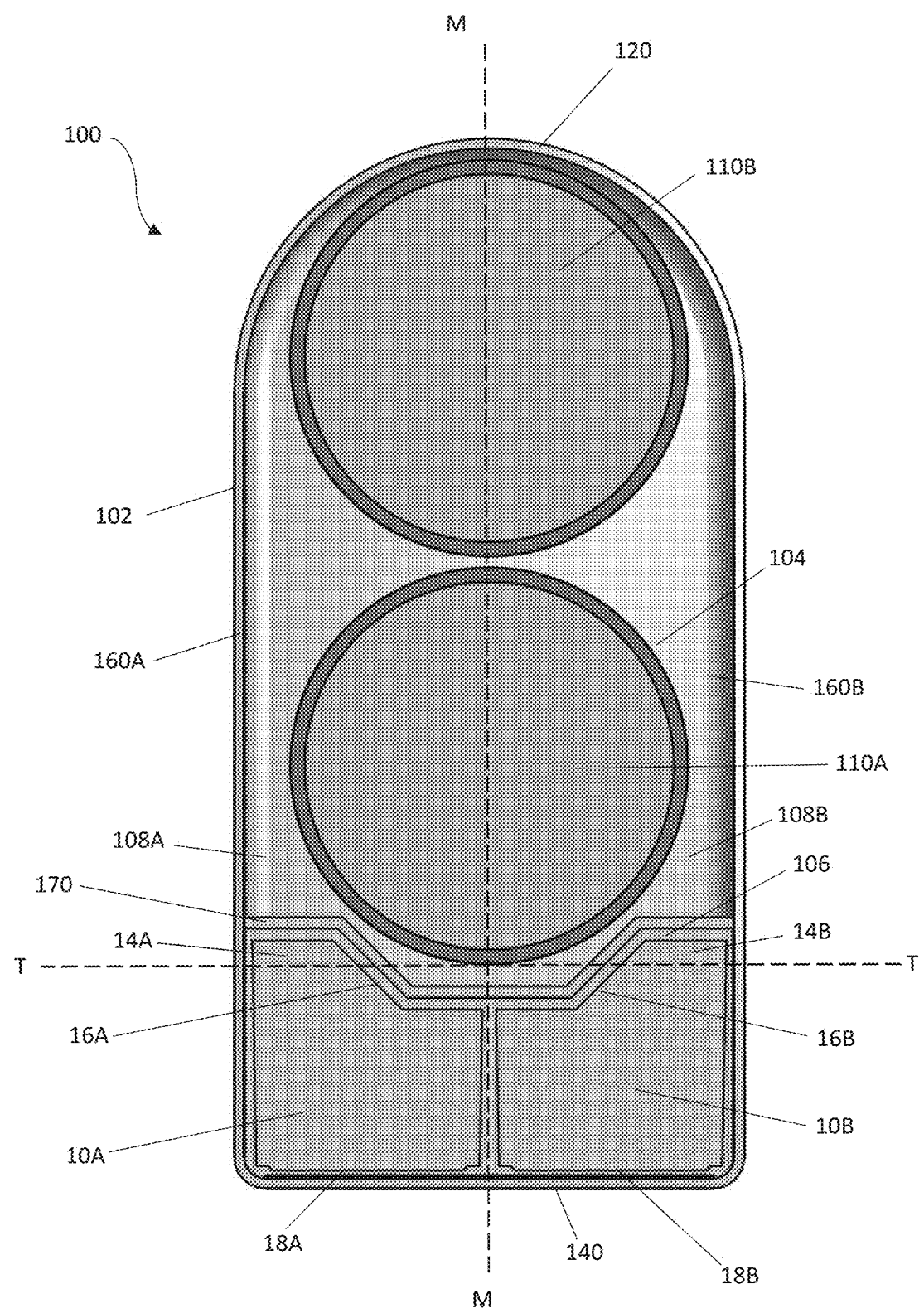
FIG. 3 is a cross sectional view showing a liquid treatment apparatus with the compressed salt block of FIG. 1 provided therein.

As shown in FIG. 1, the functional side 30 extends along the length of the elongated body 12 to form a functional face or side 35. The functional face 35 of the salt block 10, in use, is adapted in one embodiment to be closely adjacent to or directly abut an exterior of a liquid treatment tank 110A so as to position and hold the salt block 10 within the liquid treatment apparatus 100. In another embodiment as shown in FIG. 3, the functional face 30 is adapted to abut a partition or wall of the liquid treatment apparatus 100 so as to position and hold the salt block 10 within the liquid treatment apparatus 100, where said partition or wall forms one boundary of the space defined by an external surface of the tank 110A and an inner wall surface of the housing adjacent the external surface of the tank 110A. Details of the liquid treatment apparatus 100 and the arrangement of the salt block 10 therein are shown in FIG. 3, with the corresponding description as follows.

FIG. 3 shows a cross sectional view of an embodiment of the liquid treatment apparatus 100 such as a water softener system or apparatus according to a first embodiment of the present invention. The apparatus 100 comprises a housing 102 adapted to accommodate at least one liquid treatment tank 110 and at least one compressed salt block 10. The housing 102 comprises a first space portion 104 for accommodating the at least one liquid treatment tank 110 such as a water softening column, and a second space portion 106 for accommodating at least partially the at least one compressed salt block 10. In this embodiment, the at least one compressed salt block 10 and the at least one liquid treatment tank 110 are arranged vertically in parallel to a vertical axis of the housing 102.

In one embodiment, the housing 102 may comprise a substantially rounded end 120 at one side having the first space portion 104, and a substantially right-angled end 140 at the other side having the second space portion 106. The rounded end 120 and the right-angled end 140 are connected by two side walls 160A, 160B which extend in parallel to a virtual longitudinal mid-plane M-M of the housing 102, as shown in the figure.

Preferably, the housing 102 is configured to encase two cylindrical tanks 110A, 110B which align substantially vertically along the virtual mid-plane M-M in the first space portion 104; and two salt blocks 10A, 10B which are arranged one at each side of the virtual mid-plane M-M in the second space portion 106.

Although a preferred configuration of the housing 12 is illustrated and described, a person skilled in the art would appreciate that the housing should not be limited to the specific embodiment. Instead, housings of any suitable shapes and/or configurations should also be encompassed by the present invention, as long as they are adapted to accommodate one or more liquid treatment tanks and one or more salt blocks as required by the present invention. Similarly, although it is illustrated in the figure that the liquid treatment tank 100, as per the conventional water softening tank, is cylindrical in shape, it would be appreciated by the skilled person that liquid treatment tank of any types and/or shapes should also be encompassed.

The compressed salt blocks 10A, 10B, as shown in FIG. 3, are positioned between at least one inner wall of the right-angled end 140 of the housing 102, and the liquid treatment tank 110A. Specifically, the compressed salt blocks 10A, 10B each comprise a corresponding extension portion 14A or 14B which extends into a space 108A or 108B in the first space portion 104 between an external surface of the liquid treatment tank 110A and an inner wall surface of the side walls 160A or 106B of the housing 102 adjacent the external surface of the tank 110A. More specifically, the extensions 14A, 14B each extend beyond an adjacent tangent T-T of the liquid treatment tank 110A into the first space portion 104, with the adjacent tangent T-T being substantially perpendicular to the longitudinal mid-plane M-M of the housing 102.

Preferably, the extension 14 can be configured to taper towards the space 108 in the first space portion 104. More preferably, the extension 14 may comprise at least one stopping surface 16 facing the tank 110A for restricting movement of the compressed salt block 10 within the housing 102.

The extending of the extensions 14A, 14B into the corresponding spaces 108A, 108B are advantageous in that it helps maximize the use of space within the housing 102 and particularly, the use of void spaces between the curvature of the tank 110A and the housing 102. This allows more salt to be loaded into the same apparatus 100. In addition, the stopping surface 16, which is formed by extending the side 32 of the cross section A along the longitudinal body 12, is adapted to lean against the exterior of the tank 110A when, for example, the apparatus 100 is tilted or when the salt block 10 descends towards the bottom of the housing 102 over time as it erodes. The salt blocks 10 are allowed to stay upright within the housing 102, without tipping over the side walls 106 of the housing 102 or touching each other where they may subsequently fuse to form salt bridges. Because of this, no divider or dividing wall is required to be arranged between the two salt blocks 10A, 10B to separate the two blocks from jamming, which further assists in maximizing the use of space within the housing 102, i.e. no dividing wall is required between the salt blocks along line M-M.

In the embodiment as shown in the figure, the stopping surface 16 comprises at least one inclined surface. Alternatively or additionally, the stopping surface 16 may also comprise at least one curved surface, preferably comprising an inwardly curved surface with respect to the salt block.

The compressed salt block 10 may also comprise at least one positioning surface 18 opposing the stopping surface 16. The positioning surface 18 is adapted to abut at least one inner wall of the right-angled end 140 of the housing 102 so as to position the compressed salt block 10 in the second space portion 106.

Preferably, the compressed salt block 10 is configured in the shape of a prism, and more preferably, a polygonal prism as shown in FIG. 1.

In one embodiment the liquid treatment apparatus 100 may further comprise a partition 170 between the compressed salt blocks 10A, 10B and the cylindrical tank 110A. The partition 170 is arranged with at least one aperture (not shown) to allow fluid communication between the first and the second space portions 104, 106. Preferably, the stopping surface 16 of the compressed salt block 10 is configured to substantially conform with the shape of the partition 170, and the shape of the partition 170 is configured to substantially conform with the curvature of the corresponding portion of the tank 110A.

Figure 4:
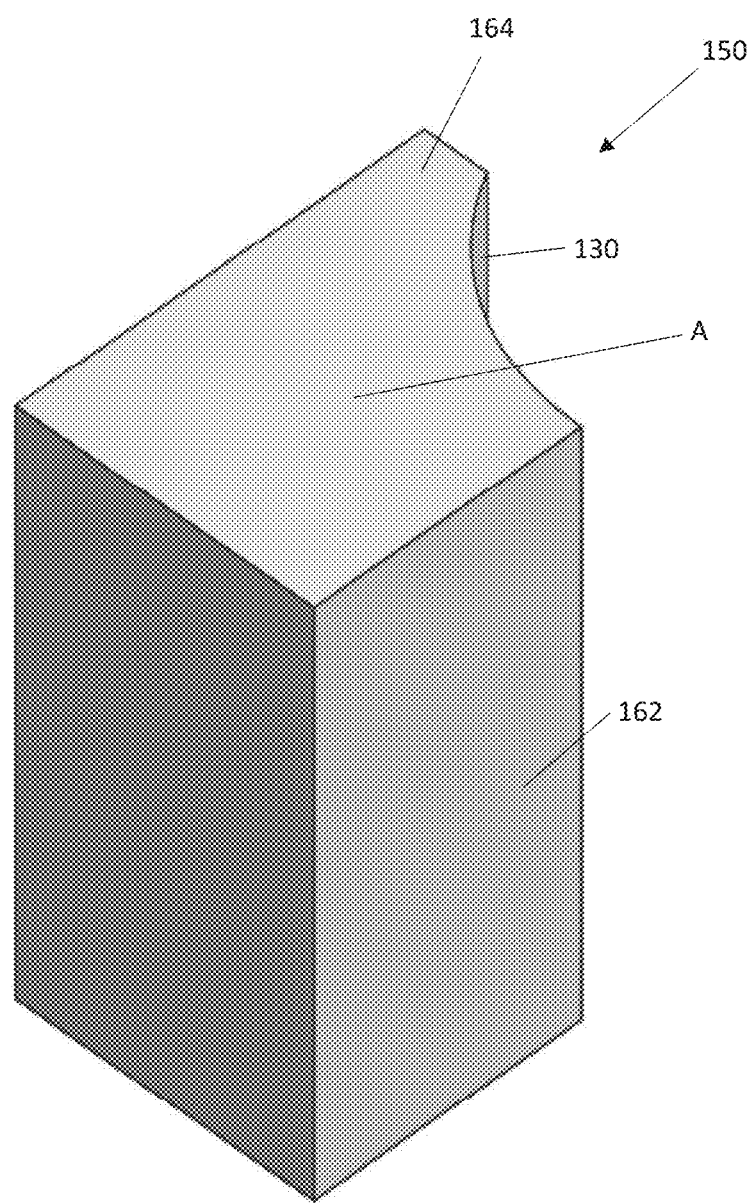
FIG. 4 is a perspective view showing a compressed salt block according to a second embodiment of the present invention.

FIG. 4 shows a compressed salt block 150 in accordance with another embodiment of the present invention. In like manner to FIG. 1, the compressed salt block 150 is configured to comprise a first main block portion and a second extension portion. As shown in the figure, the compressed salt block 150 comprises an elongated body 162 having an irregular cross section A. Reference to the cross section A illustrates that the extension portion 164 is partly defined by a curved functional side or face 130 where, by contrast, the embodiment of FIG. 1 has an indented or inclined flat face 30.

As shown in FIG. 5, a leading end of the curved portion 130a of the functional side 130 forms an acute angle α to a base line 120 thereby forming the extended portion 164 of the cross section A.

The functional face 130 of the salt block 150, in use, is adapted to be closely adjacent to or directly abut a curved exterior surface of a liquid treatment tank 210 (FIG. 6) so as to position and hold the salt block 150 within a liquid treatment apparatus 200. In this embodiment as particularly shown in FIG. 6, there is no requirement for an internal partition or wall within the liquid treatment apparatus 200 for positioning or holding the salt block 150, although a curved partition or wall could be provided in some embodiments to prevent the salt block 150 resting against the exterior surface of the liquid treatment tank 210.

Figure 6:
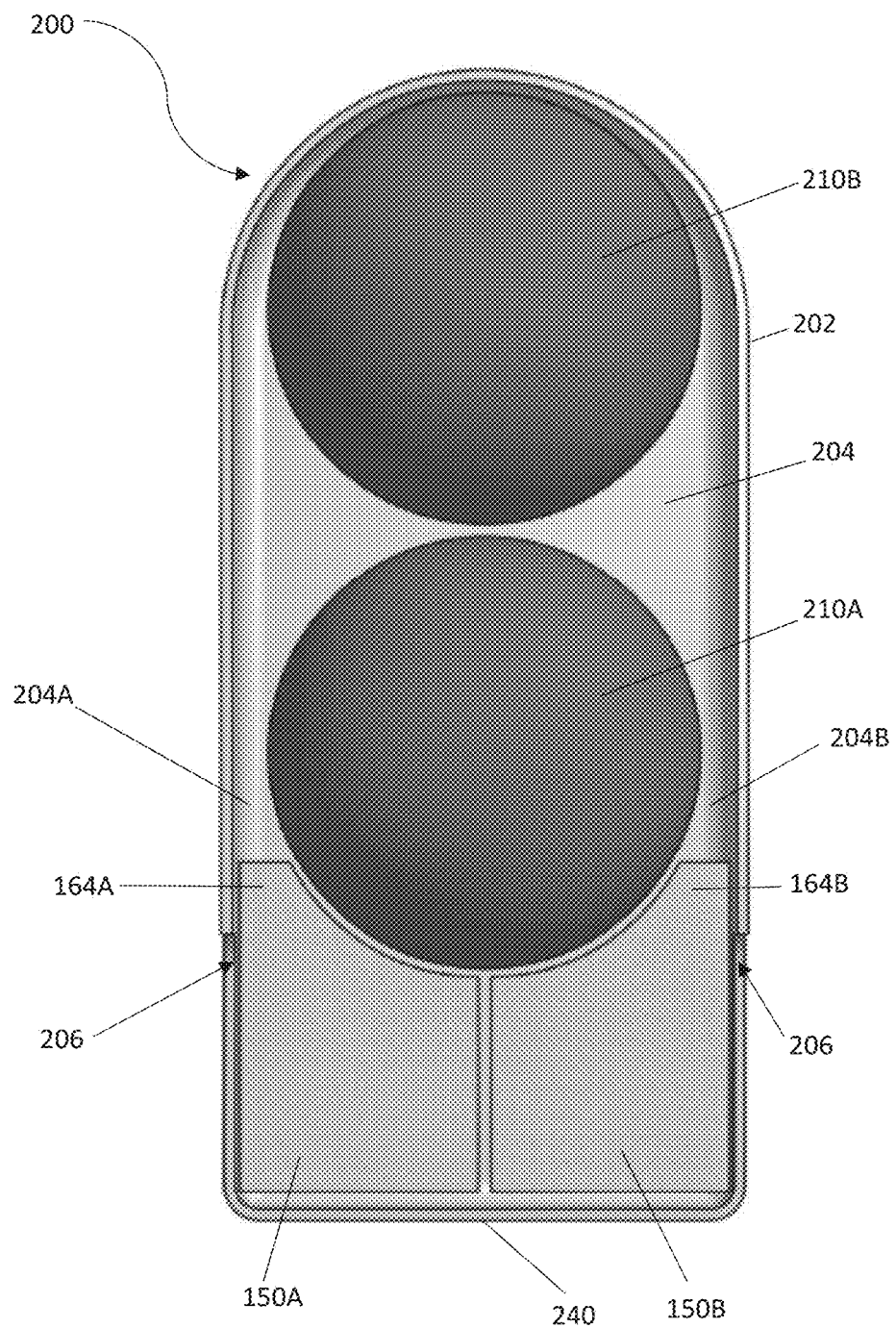
FIG. 6 is a cross sectional view showing a liquid treatment apparatus with the compressed salt block of FIG. 4 provided therein.

FIG. 6 shows a cross sectional view of a liquid treatment apparatus 200 such as a water softener system or apparatus according to a second embodiment of the present invention. The apparatus 200 comprises a housing 202 adapted to accommodate at least one liquid treatment tank 210A,B and at least one compressed salt block 150A,B. The housing 202 comprises a first space portion 204 for accommodating the at least one liquid treatment tank 210A,B such as a water softening column, and a second space portion 206 for accommodating at least partially the at least one compressed salt block 150A,B.

Preferably, the housing 202 is configured to encase two cylindrical tanks 210A, 210B which align substantially vertically along a mid-plane of the first space portion 204; and two salt blocks 150A, 150B which are arranged one at each side of the mid-plane in the second space portion 206.

The compressed salt blocks 150A, 150B, as shown in FIG. 6, are positioned between at least one inner wall of a right-angled end 240 of the housing 202, and the liquid treatment tank 210A. Specifically, the compressed salt blocks 150A, 150B each comprise a corresponding extension 164A, 164B which extends into a space 204A or 204B in the first space portion 204.

FIGS. 7 to 10 show a compressed salt block 250 in accordance with another embodiment of the present invention closely related to the embodiment shown in FIGS. 4 to 6. In like manner to the embodiment of FIGS. 4 to 6, the compressed salt block 250 is configured to comprise a first main block portion and a second extension portion. As shown in FIGS. 7 to 10, the compressed salt block 250 comprises an elongated body 262 having an irregular cross section. Similarly to the embodiment of FIGS. 4 to 6, the extension portion 264 is partly defined by a curved functional side or face 230.

The functional face 230 of the salt block 250, in use, is adapted to be closely adjacent to or directly abut a curved exterior surface of a liquid treatment tank 310 (FIG. 11) so as to position and hold the salt block 250 within a liquid treatment apparatus 300. As particularly shown in FIG. 11, there is no requirement for an internal partition or wall within the liquid treatment apparatus 300 for positioning or holding the salt block 250, although a curved partition or wall could be provided in some embodiments to prevent the salt block 250 resting against the exterior surface of the liquid treatment tank 310.

Figure 7:
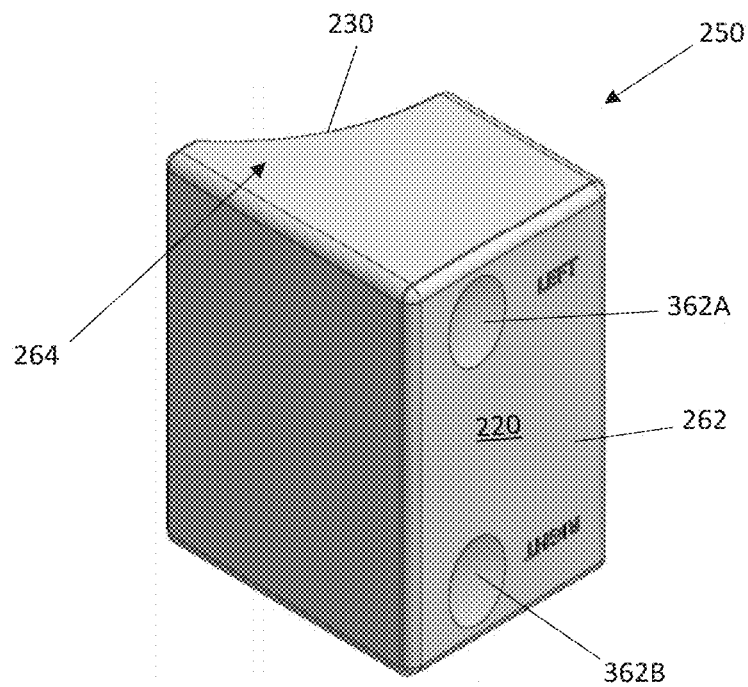
FIG. 7 is a front perspective view showing a compressed salt block according to a third embodiment of the present invention.

As seen in FIGS. 7 to 10, both the base side or face 220 and the functional side or face 230 of the salt block 10 may include respective indentations 362A, B, 364A,B positioned near the top and/or bottom edges/faces of the salt block 10 to aid gripping of the salt block 10 by a user. It is preferred that the indentations 362A,B provided on the base face 220 each comprise an indentation or recess adapted to be gripped by a user's thumb. As such, each indentation 362A,B is preferably round in shape and more preferably elliptical in shape with its longest axis orientated in a vertical direction as shown in FIGS. 7 to 10. It is also preferred that each indentation 362A,B curves inwardly. In a preferred embodiment, each of the indentations 362A,B has a maximum depth at its centre of 3 mm, has a width in the order of 25 mm along its minor axis and a length in the order of 33 mm along its major axis. It is also preferred that each of said indentations 362A,B is positioned at a distance to its centre of 25 mm from the nearest end face of the salt block. Preferably, each indentation 362A,B is provided nearer to one vertical side of the salt block than the other i.e. off-centre of the base surface 220. As seen in only FIG. 7, adjacent to respective ones of the indentations 362A,B may be embossed indications of the insertion orientation of the salt block when a user grips a selected one of said indentations 362A,B. For example, as seen in FIG. 7, an upper one of the indentations 362A as viewed in the figure has associated with it the word "LEFT" which indicates that said slat block is to be inserted into a left side of the water treatment apparatus when the salt block is in the orientation shown in FIG. 7. Conversely, the lower indentation 362B as viewed in FIG. 7 has the word "RIGHT" associated therewith to indicate that when the salt block as seen in FIG. 7 is turned the other way up it is then to be inserted into a right side of the water treatment apparatus as can be more clearly seen in FIG. 11.

It is preferred that the indentations 364A,B provided on the functional face 230 each comprise an indentation or recess adapted to be gripped by a user's fingers and more particularly the user's fingertips when placed side by side. As such, each indentation 364A,B is preferably rectangular in shape, e.g. slot shaped, with its longest axis orientated in a horizontal direction as shown in FIGS. 7 to 10. The indentations 364A,B are preferably provided in the curved surface of the functional face 230 and preferably provided generally central of said face. It will be understood that, in the case of the embodiment of the salt block shown in FIGS. 1 to 3, similar elongate slot shaped indentations could be provided in the inclined flat surface of the functional face. It is also preferred that each indentation 364A,B is about the same depth along a major portion of its horizontal length. In a preferred embodiment, each of the indentations 362A,B has a maximum depth along a major portion of its horizontal length of about 2 mm, has a horizontal width in the order of 50 mm and a height in the order of 13 mm. It is also preferred that each of said indentations 362A,B is positioned from the nearest end face of the salt block about 1 mm to the closest edge of the indentation 364A,B.

It is considered that the arrangement of the indentations 362A,B, 364A,B as described above provides an ergonomically efficient means for a user to grip the salt block to lower it into a water treatment apparatus bearing in mind that the salt block may weigh a number of kilograms. The thumb grip indentations 362A,B on the flat back base surface 220 of the block allow a user to strongly grip the base surface of the salt block with the pad of their thumb placed in the inwardly curved indentation 362A,B. The slot shaped indentations 364A,B provided in the functional face 230 of the salt block allow a user to grip the curved surface of said functional face with the pads of their bunched fingertips placed in a channel defined by the slot shaped indentation 364A,B. The peripheral boundary of the channel may be curved to improve comfort of gripping by a user's fingertips.

It will be appreciated from the foregoing that only a single mold is provided for forming the salt block according to the embodiments of the invention as said salt block comprises both a left side and a right side block depending on its orientation, i.e. depending on which way up the block is placed.

Figure 11:
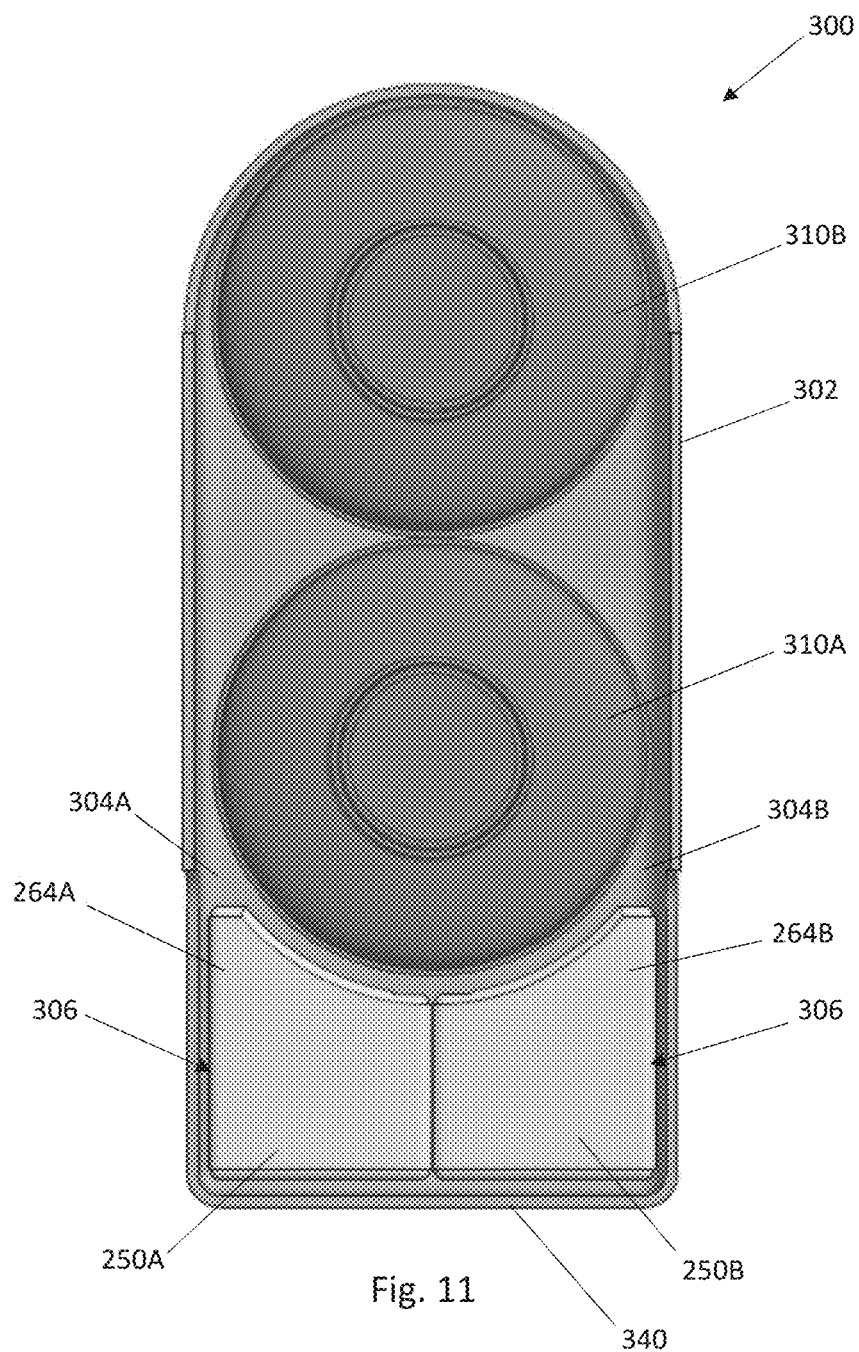
FIG. 11 is a cross sectional view showing a liquid treatment apparatus with the compressed salt block of FIG. 7 provided therein.

FIG. 11 shows a cross sectional view of a liquid treatment apparatus 300 such as a water softener system or apparatus according to another embodiment of the present invention. The apparatus 300 comprises a housing 302 adapted to accommodate at least one liquid treatment tank 310A,B and at least one compressed salt block 250A,B as shown in FIGS. 7 to 10. The housing 302 comprises a first space portion 304 for accommodating the at least one liquid treatment tank 310A,B such as a water softening column, and a second space portion 306 for accommodating at least partially the at least one compressed salt block 250A,B.

Preferably, the housing 302 is configured to encase two cylindrical tanks 310A, 310B which align substantially vertically along a mid-plane of the first space portion 304; and two salt blocks 250A, 250B which are arranged one at each side of the mid-plane in the second space portion 306.

The compressed salt blocks 250A, 250B, as shown in FIG. 11, are positioned between at least one inner wall of a right-angled end 340 of the housing 302, and the liquid treatment tank 310A. Specifically, the compressed salt blocks 250A, 250B each comprise a corresponding extension 264A, 264B which extends into a space 304A or 304B in the first space portion 304.

The reference to "functional side" of the salt block in all embodiments is a reference to the fact that this side or face of the salt block functions to support the salt block in an upright position when inserted into a water treatment apparatus. The inclined or curved functional side or face abuts a surface to maintain the upright posture of the salt block as it slowly erodes to provide the brine solution in the water treatment apparatus.

Figure 12:
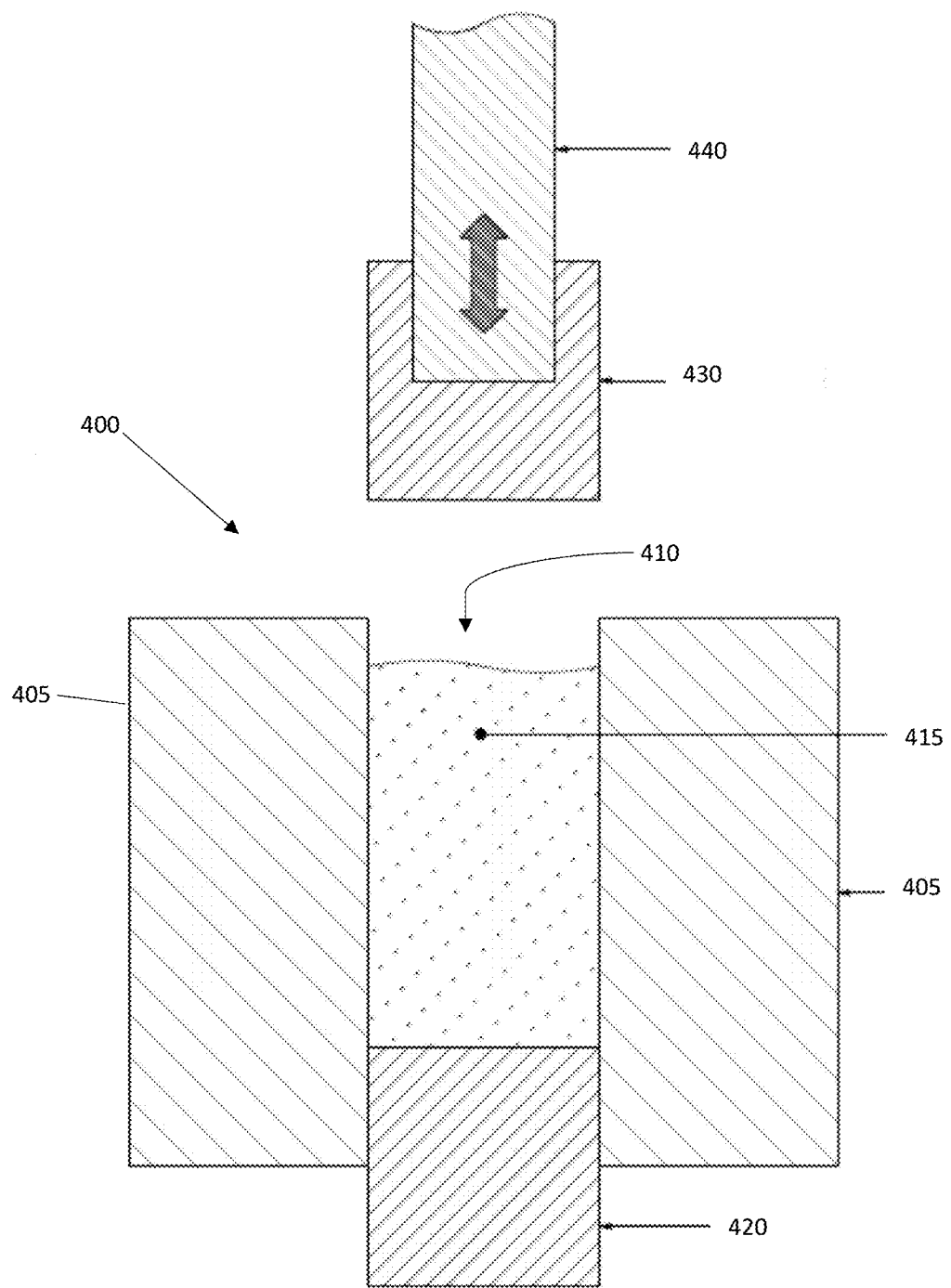
FIG. 12 is a side sectional view of a mold for forming the compressed salt block according to any of the embodiments of the invention.

FIG. 12 is a side sectional view of a mold 400 for forming the compressed salt blocks 10, 150, 250 according to any of the embodiments of the invention. The mold 400 has a body 405 defining a cavity 410. The cavity 410 is shaped to the exterior shape of the compressed salt block 10, 150, 250. A bottom of the cavity 410 is blocked by a lower die 420 which is preferably fixed in position with respect to the body 405 of the mold 400. An upper die 430 is positioned above the mold body 405, but is configured to lower into the cavity 410 for the purpose of compressing loose salt 415 loaded into the cavity 410. The upper die may be lowered into the cavity 410 by a hydraulic press 440 or the like which applies sufficient predetermined pressure to the loose salt 415 loaded into the cavity 410 to form a compressed salt block 10, 150, 250 of a desired vertical height. It has surprisingly been found that, due to the novel shape of the compressed salt block 10, 150, 250 with its truncated triangular extension portion, arranging the upper die 430 and/or lower die 420 to compress the loose salt 415 loaded into the cavity 410 in a direction perpendicular to one or both of the top and bottom horizontal faces of the compressed salt block 10, 150, 250 being formed, i.e. the direction of compression of the loose salt 415 is parallel to the exterior hypotenuse side 32 of the extension portion of the compressed salt block being formed, prevents or at least reduces cracks and/or fissures being formed in the exterior hypotenuse side 32 of the extension portion of the compressed salt block being formed.

In general, the compressed salt block and the use of the compressed salt block in a water softening apparatus of the present invention is advantageous in that it significantly maximizes the use of space within the housing of the apparatus. Particularly, the extensions of the salt blocks are capable of taking up the void spaces between the curvature of the water softening tank and the housing. This allows more salt to become available in the same apparatus and/or for the apparatus as a whole to be made smaller. In addition, the extension provides a stopping surface which is adapted to lean against the exterior of the cylindrical tank or a conforming wall when, for example, the apparatus is tilted upon movement or when the salt block descends towards the bottom of the housing over time. This arrangement assists in keeping the salt blocks upright within the housing without tipping towards the side walls 106 of the housing 102 or fusing with each other to form salt bridges between the two blocks. No block divider is thus required to separate the two blocks which further assists in maximizing the use of space within the apparatus.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A water softener apparatus compressed salt block, the salt block formed by molding as a compressed salt block to comprise:
   a longitudinally extending elongated body having a vertical longitudinal axis, a top horizontal face, a bottom horizontal face, and comprising:
   a block portion having a rectangular cross-section taken in a horizontal plane that is perpendicular to the vertical longitudinal axis, wherein the rectangular cross-section is defined by a major front exterior surface that is a base surface of the block portion, a major rear surface, and a pair of exterior minor surfaces; and
   an extension portion formed integrally with the major rear surface of the rectangular cross-section of the block portion as a single compressed salt block, wherein the extension portion has a cross-sectional area in said horizontal plane in the form of a right truncated triangle, the extension portion having a first exterior side that is contiguous with one of the pair of exterior minor side surfaces of the block portion, a second side that is contiguous with the major rear surface of the block portion, and an exterior hypotenuse side that extends at an acute angle relative to the base surface of the block portion from a rear edge of the first exterior side toward the major rear surface of the block portion;
   wherein a horizontal cross section of the elongated body is constant along the vertical longitudinal axis of the elongated body and the exterior hypotenuse side of the extension portion defines a functional face adapted to abut against a vertical wall or an exterior vertical surface of a tank of a water softener apparatus to position the compressed salt block within said water softener apparatus.

2. The water softener apparatus compressed salt block according to claim 1, wherein the exterior hypotenuse is planar.

3. The water softener apparatus compressed salt block according to claim 1, wherein the exterior hypotenuse is curved in said horizontal plane.

4. The water softener apparatus compressed salt block according to claim 1, wherein the base side of the block portion has shallow indentations formed therein proximate the top and the bottom horizontal faces of the salt block, said shallow indentations providing a first finger grip portion to enable the salt block to be lifted and lowered into part of a water softener apparatus adapted to receive said salt block.

5. The water softener apparatus compressed salt block according to claim 4, wherein the exterior hypotenuse side of the extension portion has shallow indentations adjacent each of the top and the bottom faces of the salt block, said shallow indentations formed therein proximate each of the top and the bottom faces of the salt block, said shallow indentations providing a second finger grip portion to enable the salt block to be lifted and lowered into part of a water softener apparatus adapted to receive said salt block.

6. A water softener apparatus, comprising:
   a housing adapted to accommodate at least one tank and at least one compressed salt block comprising:
   a longitudinally extending elongated body having a vertical longitudinal axis, a top horizontal face, a bottom horizontal face, and comprising:
   a block portion having a rectangular cross-section taken in a horizontal plane that is perpendicular to the vertical longitudinal axis, wherein the rectangular cross-section is defined by a major front exterior surface that is a base surface of the block portion, a major rear surface, and a pair of exterior minor surfaces; and
   an extension portion formed integrally with the major rear surface of the rectangular cross-section of the block portion as a single compressed salt block, wherein the extension portion has a cross-sectional area in said horizontal plane in the form of a right truncated triangle, the extension portion having a first exterior side that is contiguous with one of the pair of exterior minor side surfaces of the block portion, a second side that is contiguous with the major rear surface of the block portion, and an exterior hypotenuse side that extends at an acute angle relative to the base surface of the block portion from a rear edge of the first exterior side toward the major rear surface of the block portion;
   wherein a horizontal cross section of the elongated body is constant along the vertical longitudinal axis of the elongated body and the exterior hypotenuse side of the extension portion defines a functional face adapted to abut against a vertical wall or an exterior vertical surface of the tank of the water softener apparatus to position the compressed salt block within said water softener apparatus;

wherein the housing of said water softener apparatus comprises a first space portion for accommodating said at least one tank, and a second space portion for accommodating the at least one compressed salt block;

wherein the extension portion of the at least one compressed salt block extends into a space in the second space portion between an external surface of the at least one tank and an inner wall surface of the housing adjacent the external surface of the at least one tank to thereby position the at least one compressed salt block within the housing.

7. The water softener apparatus according to claim 6, wherein the exterior hypotenuse side of the at least one compressed salt block comprises at least one stopping surface facing the at least one tank for restricting movement of the at least one compressed salt block within the housing.

8. The water softener apparatus according to claim 7, wherein the at least one stopping surface comprises at least one of an inclined surface and a curved surface.

9. The water softener apparatus according to claim 8, wherein said base surface of the compressed salt block comprises at least one positioning surface opposing the at least one stopping surface for positioning the at least one compressed salt block in the second space portion.

10. The water softener apparatus according to claim 6, wherein the second space portion is adapted to accommodate two compressed salt blocks, one on each side of a longitudinal mid-plane of the housing.

11. The water softener apparatus according to claim 10, wherein the at least one tank is cylindrical in shape, and that the extension portions of the two compressed salt blocks each extend beyond an adjacent tangent of the at least one tank into the second space portion, with the adjacent tangent being substantially perpendicular to the longitudinal mid-plane of the housing.

12. The water softener apparatus according to claim 11, wherein the extension portions are extended into the corresponding spaces in the second space portion between the external surface of the cylindrical tank and two opposing longitudinal side walls of the housing adjacent the external surface of the cylindrical tank.

13. A method of forming a compressed salt block comprising:

a longitudinally extending elongated body having a vertical longitudinal axis, a top horizontal face, a bottom horizontal face, and comprising:

a block portion having a rectangular cross-section taken in a horizontal plane that is perpendicular to the vertical longitudinal axis, wherein the rectangular cross-section is defined by a major front exterior surface that is a base surface of the block portion, a major rear surface, and a pair of exterior minor surfaces; and an extension portion formed integrally with the major rear surface of the rectangular cross-section of the block portion as a single compressed salt block, wherein the extension portion has a cross-sectional area in said horizontal plane in the form of a right truncated triangle, the extension portion having a first exterior side that is contiguous with one of the pair of exterior minor side surfaces of the block portion, a second side that is contiguous with the major rear surface of the block portion, and an exterior hypotenuse side that extends at an acute angle relative to the base surface of the block portion from a rear edge of the first exterior side toward the major rear surface of the block portion;

wherein a horizontal cross section of the elongated body is constant along the vertical longitudinal axis of the elongated body and the exterior hypotenuse side of the extension portion defines a functional face adapted to abut against a vertical wall or an exterior vertical surface of a tank of a water softener apparatus to position the compressed salt block within said water softener apparatus;

the method comprising the step of compressing loose salt in a mold in a direction perpendicular to the top horizontal face and/or bottom horizontal face of the compressed salt block being formed.

* * * * *